United States Patent
Kodama

(10) Patent No.: US 11,366,595 B2
(45) Date of Patent: Jun. 21, 2022

(54) MANAGEMENT APPARATUS AND NON-TRANSITORY COMPUTER-READABLE STORAGE MEDIUM FOR STORING PROGRAM

(71) Applicant: FUJITSU LIMITED, Kawasaki (JP)

(72) Inventor: Hiroyoshi Kodama, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/242,341

(22) Filed: Apr. 28, 2021

(65) Prior Publication Data

US 2022/0050611 A1    Feb. 17, 2022

(30) Foreign Application Priority Data

Aug. 13, 2020    (JP) .............................. JP2020-136787

(51) Int. Cl.
G06F 3/06    (2006.01)

(52) U.S. Cl.
CPC .......... *G06F 3/0635* (2013.01); *G06F 3/0611* (2013.01); *G06F 3/0631* (2013.01); *G06F 3/0653* (2013.01); *G06F 3/0683* (2013.01)

(58) Field of Classification Search
CPC .... G06F 3/0611; G06F 3/0631; G06F 3/0635; G06F 3/0653; G06F 3/068335;

(Continued)

(56) References Cited

U.S. PATENT DOCUMENTS

2008/0172518 A1 * 7/2008 Shmulevich ........ G06F 12/0246
                                                            711/E12.019
2014/0325121 A1    10/2014 Akutsu et al.
(Continued)

FOREIGN PATENT DOCUMENTS

WO    2014/174653 A1    10/2014
WO    2015/132877 A1    9/2015

OTHER PUBLICATIONS

O. Kwon and K. Koh, "Swap space management technique for portable consumer electronics with NAND flash memory," in IEEE Transactions on Consumer Electronics, vol. 56, No. 3, pp. 1524-1531, Aug. 2010, doi: 10.1109/TCE.2010.5606292. (Year: 2010).*

*Primary Examiner* — Khoa D Doan
(74) *Attorney, Agent, or Firm* — Fujitsu Patent Center

(57) ABSTRACT

A management apparatus includes: a communication circuit configured to communicate with a first information processing apparatus and a second information processing apparatus, the first information processing apparatus including a first memory and a second memory, the second information processing apparatus including a third memory and a fourth memory, a total capacity of the third memory and the fourth memory being larger than a capacity of the first memory; and a processing circuit configured to obtain, via the communication circuit, a data volume received by the first information processing apparatus from a third information processing apparatus, detect an increase in usage of the first memory based on the data volume, and perform control to switch, in response to the increase in the usage of the first memory, a destination of data transmission by the third information processing apparatus from the first information processing apparatus to the second information processing apparatus.

12 Claims, 10 Drawing Sheets

(58) Field of Classification Search
CPC ............. G06F 12/0615; G06F 12/0623; G06F 12/023–0246
See application file for complete search history.

(56) References Cited

U.S. PATENT DOCUMENTS

2016/0253263 A1    9/2016  Takada
2016/0370998 A1*  12/2016  Shung .................. G06F 3/0655

* cited by examiner

MANAGEMENT APPARATUS AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2020-136787, filed on Aug. 13, 2020, the entire contents of which are incorporated herein by reference.

FIELD

The embodiments discussed herein are related to a management apparatus and a non-transitory computer-readable storage medium storing a program.

BACKGROUND

An information processing apparatus such as a computer includes an arithmetic device such as a central processing unit (CPU) and a main storage device such as a dynamic random-access memory (DRAM) that stores therein data for use in processing by the arithmetic device. In this regard, the information processing apparatus may run short of the capacity by using the main storage device alone in some cases depending on the data volume to be processed by the information processing apparatus. Therefore, a virtual memory may be used. To the virtual memory, a partial storage area of an auxiliary storage device such as a hard disk drive (HDD) or a solid-state drive (SSD) is allocated. The above area of the auxiliary storage device may be referred to as a swap area. When a capacity shortage occurs in the main storage device, part of data stored in the main storage device is swapped out to the swap area of the auxiliary storage device.

For example, there has been proposed a computer in which an SSD is provided with a swap area for storing part of data to be stored In a DRAM, and the sizes of a work area and a cache area of the DRAM and the sizes of the swap area and a cache area of the SSD are changeable.

There has been proposed a storage system for locating data among tiers while taking a sudden short-cycle load increase or decrease into account, and improving the data hit rate in high tiers.

Examples of the related art include International Publication Pamphlet Nos. WO 2015/132877 and WO 2014/174653.

The swap area is provided in the auxiliary storage device. An access speed of the auxiliary storage device is lower than an access speed of the main storage device. Therefore, the access speed to the swapped-out data decreases.

In an aspect of the embodiments disclosed below, there is provided a solution to suppress a decrease in the access speed to data.

SUMMARY

According to an aspect of the embodiments, a management apparatus includes: a communication circuit configured to communicate with a first information processing apparatus and a second information processing apparatus, the first information processing apparatus including a first memory and a second memory, the first memory being a memory to be used as a main storage device of the first information processing apparatus, the second memory being a memory having a swap area for the first memory and having an access speed lower than an access speed of the first memory, the second information processing apparatus including a third memory and a fourth memory, the third memory being a memory to be used as a main storage device of the second information processing apparatus, the fourth memory being a memory to be used as a main storage device and having an access speed lower than an access speed of the third memory and higher than the access speed of the second memory, a total capacity of the third memory and the fourth memory being larger than a capacity of the first memory; and a processing circuit configured to obtain, via the communication circuit, a data volume received by the first information processing apparatus from a third information processing apparatus, detect an increase in usage of the first memory based on the data volume, and perform control to switch, in response to the increase in the usage of the first memory, a destination of data transmission by the third information processing apparatus from the first information processing apparatus to the second information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, the embodiments will be described with reference to the drawings.

First Embodiment

A first embodiment will be described.

Figure 1:
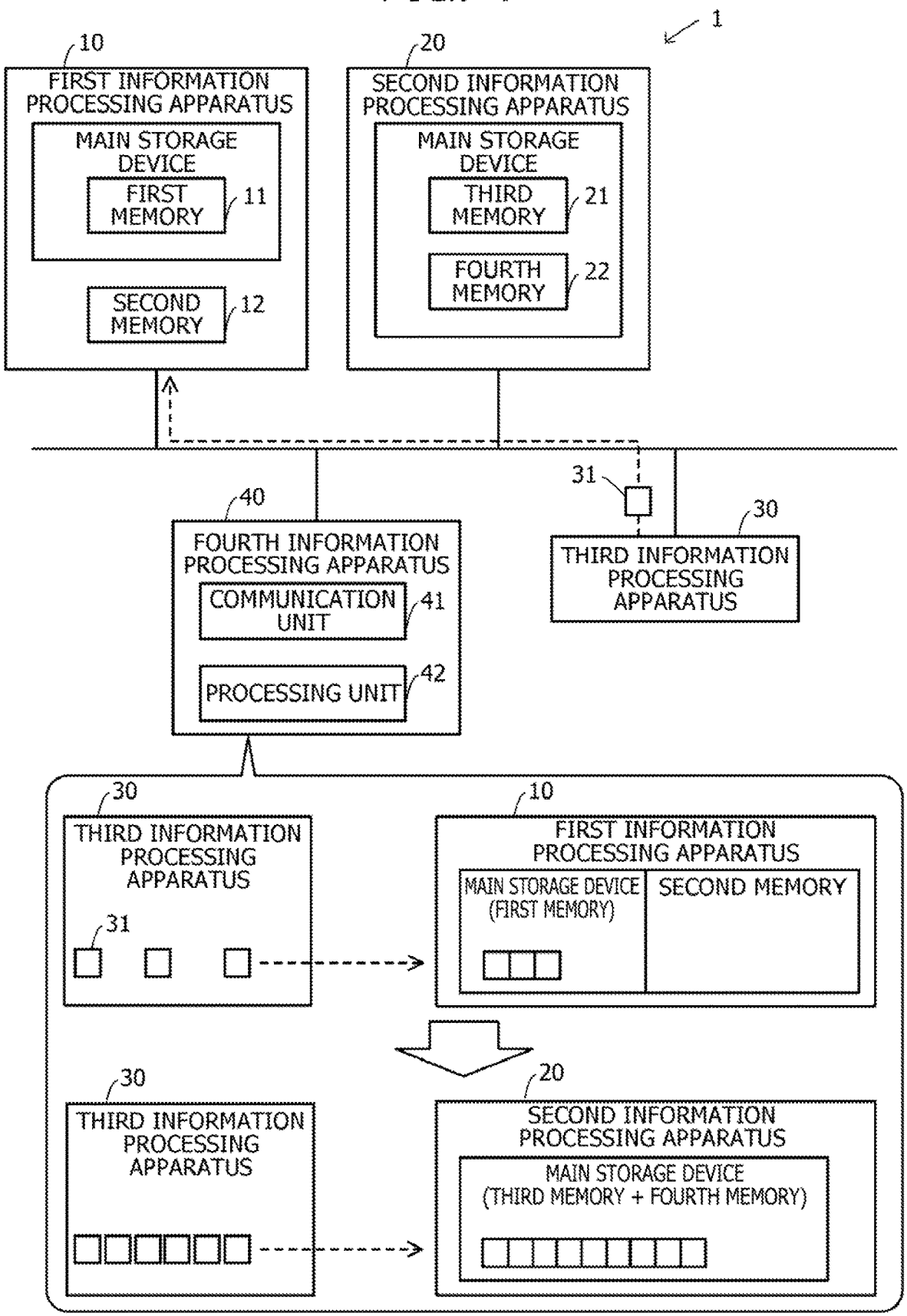
FIG. 1 is a diagram for explaining an information processing system according to a first embodiment.

FIG. 1 is a diagram for explaining an information processing system according to the first embodiment.

An information processing system 1 includes a first information processing apparatus 10, a second information processing apparatus 20, a third information processing apparatus 30, and a fourth information processing apparatus 40. The information processing system 1 is a system in which the first information processing apparatus 10 or the second information processing apparatus 20 processes data 31 in the third information processing apparatus 30.

The first information processing apparatus 10 includes a first memory 11 and a second memory 12. The first memory 11 is a memory to be used as a main storage device of the first information processing apparatus 10. The first memory 11 is, for example, a DRAM. The second memory 12 is a memory including a swap area for the first memory 11 and achieving an access speed lower than that of the first memory 11. The second memory 12 is, for example, an auxiliary storage device such as an HDD or an SSD.

The second information processing apparatus 20 includes a third memory 21 and a fourth memory 22. The third memory 21 and the fourth memory 22 are memories to be used as a main storage device of the second information processing apparatus 20. The third memory 21 is, for example, a DRAM. The access speed of the fourth memory 22 is lower than that of the third memory 21 and higher than that of the second memory 12. The fourth memory 22 is, for example, a data center persistent memory (DCPM). The DCPM is a memory which has features of having a large capacity and achieving middle performance between those of the DRAM and the SSD, and is usable as a main storage device in place of the DRAM. Uke the DRAM, the DCPM is attached to, for example, a dual inline memory module (DIMM) slot mounted on a main board of the second information processing apparatus 20.

The total capacity of the third memory 21 and the fourth memory 22 is larger than the capacity of the first memory 11. For example, the capacity of the main storage device of the second information processing apparatus 20 is larger than the capacity of the main storage device of the first information processing apparatus 10. Thus, even when the volume of the data 31 (data volume) to be processed is large, the second information processing apparatus 20 is capable of processing a large data volume on the main storage device, and therefore is less likely to run short of the capacity of the main storage device than the first information processing apparatus 10 is.

The access speed of the fourth memory 22 constituting the main storage device of the second information processing apparatus 20 is lower than that of the third memory 21. However, the access speed of the fourth memory 22 is higher than that of the second memory 12. Thus, when the data 31 is processed on the main storage device of the second information processing apparatus 20, a decrease in the access speed may be suppressed compared with the case where the first information processing apparatus 10 having a capacity shortage of the main storage device attempts to process the data 31 but results in the occurrence of swapping-out.

The third information processing apparatus 30 transmits the data 31 to the first information processing apparatus 10 or the second information processing apparatus 20.

The fourth information processing apparatus 40 is an apparatus usable for communication of the data 31, like the first information processing apparatus 10, the second information processing apparatus 20, and the third information processing apparatus 30. For example, in the information processing system 1, the fourth information processing apparatus 40 may function as the destination of transmission of the data 31 like the first information processing apparatus 10 or the second information processing apparatus 20, or may function as the source of transmission of the data 31 like the third information processing apparatus 30. The fourth information processing apparatus 40 has a function as a management apparatus that manages a transmission condition of the data 31. The functions of the management apparatus of the fourth information processing apparatus 40 to be described below may be executed by any one of the first information processing apparatus 10, the second information processing apparatus 20, and the third information processing apparatus 30 which acts as a master (management apparatus).

The fourth information processing apparatus 40 includes a communication unit 41 and a processing unit 42. The communication unit 41 is implemented by, for example, a network interface card (NIC) that performs wired or wireless communication. The communication unit 41 communicates with the first information processing apparatus 10 and the third information processing apparatus 30.

The processing unit 42 is, for example, a CPU, a graphics processing unit (GPU), a digital signal processor (DSP), or the like. The processing unit 42 may be a processor that executes a program. The "processor" may include a set of multiple processors (multiprocessor). Alternatively, the processing unit 42 may be implemented by an electronic circuit such as a field-programmable gate array (FPGA) or an application-specific integrated circuit (ASIC).

The processing unit 42 obtains, via the communication unit 41, a data volume received by the first information processing apparatus 10 from the third information processing apparatus 30, and detects an increase in the usage of the first memory 11 based on the data volume. Then, the processing unit 42 performs control to switch a destination of data transmission by the third information processing apparatus 30 from the first information processing apparatus 10 to the second information processing apparatus 20 in response to the increase in the usage of the first memory 11.

For example, when the processing unit 42 detects that the first memory 11 may run short of the capacity due to an increase in the usage of the first memory 11 (this situation is also referred to as the occurrence of swapping-out due to a capacity shortage), the processing unit 42 performs the control to switch the destination of transmission of the data 31. In conceivable switching control, for example, the processing unit 42 transmits, to the third information processing apparatus 30, an instruction to change the destination of transmission of the data 31 to the second information processing apparatus 20. In alternative conceivable switching control, the processing unit 42 transmits the instruction to change the destination of transmission of the data 31 to the second information processing apparatus 20 to a communication device such as a load distribution device that receives the data 31 from the third information processing apparatus and forwards the data 31 to the first information processing apparatus 10.

Thus, in the case where swapping-out may occur by using only the capacity of the main storage device of the first information processing apparatus and resultantly cause a decrease in the access speed to the data 31 (processing delay), the fourth information processing apparatus 40 allocates a main storage device having a larger capacity and thereby avoids swapping-out due to the capacity shortage.

Even when the data volume increases, the fourth information processing apparatus 40 enables the data 31 to be processed continuously without causing an extreme decrease in the access speed to the data 31 in the above way, and thus may improve the reliability.

On the other hand, when high-speed processing is possible with the capacity of the main storage device of the first information processing apparatus (when the usage of the first memory 11 is not increased), the fourth information processing apparatus 40 sets the first information processing apparatus 10 as the destination of transmission of the data 31 by the third information processing apparatus 30. In this way, the fourth information processing apparatus 40 lets the second information processing apparatus 20 (the information processing apparatus having the main storage device with the large capacity) be also available for other processes. Thus, the information processing system 1 achieves cost saving because it is unnecessary to additionally prepare an information processing apparatus including a main storage device having a large capacity for each processing in order to cope with an increase in the data volume.

Second Embodiment

Next, a second embodiment will be described.

Figure 2:
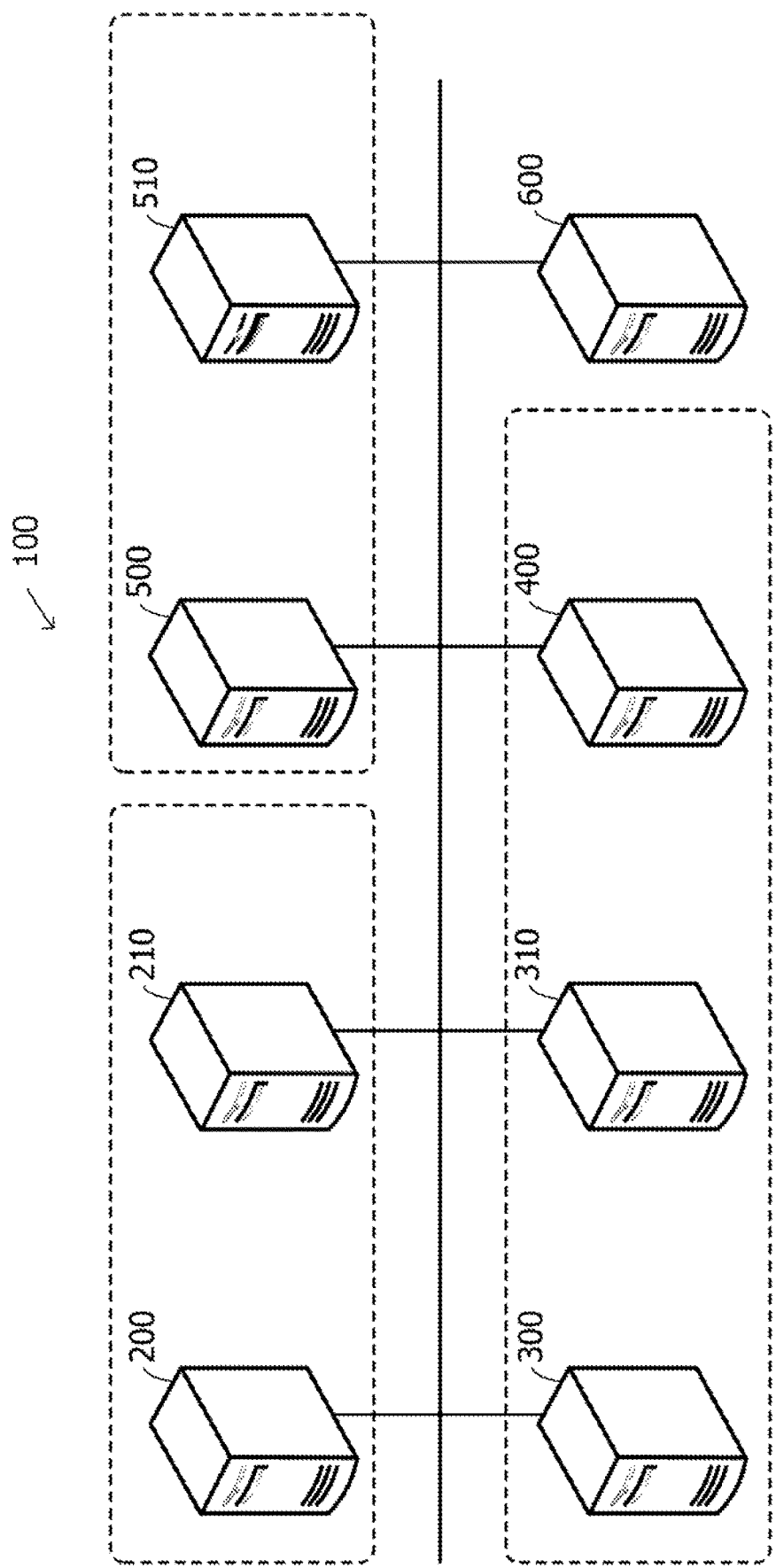
FIG. 2 illustrates an example of an information processing system according to a second embodiment.

FIG. 2 illustrates an example of an information processing system according to the second embodiment.

An information processing system 100 is a cloud service system that provides cloud services. The cloud service system may provide various services by using virtual environments and container environments constructed in servers. For example, the cloud service system may provide an application in which functions in the units called microservices are combined together.

The information processing system 100 performs stream processing on data for a service (data related to the service) to be provided by the system. The information processing system 100 uses middleware called Apache Kafka (registered trademark) for data transmission and reception. Apache Kafka provides a distributed data queue to be used for data exchange between apparatuses. Apache Kafka includes producer, broker, and consumer functions.

The producer collects data to be processed for the service and transmits the data to the broker. The broker enqueues the data received from the producer in the main storage device, and, in response to a request, dequeues the data and provides the data to the consumer. The consumer acquires the data from the broker and passes the acquired data to a predetermined application.

Software modules for implementing these functions of Kafka are deployed on multiple servers included in the information processing system 100 by using a virtualization mechanism such as virtual machines or container virtualization.

The information processing system 100 includes the multiple servers functioning as producers, multiple servers functioning as brokers, multiple servers functioning as consumers, and a management apparatus 600. The multiple servers functioning as the producers, the multiple servers functioning as the brokers, the multiple servers functioning as the consumers, and the management apparatus 600 are coupled to each other via a network.

The multiple servers functioning as the producers include servers 200, 210, and so on. Each of the servers functioning as the producers collects data to be processed for a service and transmits the data to a broker.

In the information processing system 100, each of the servers 200, 210, and so on functions as the producer for a certain service. For example, the server 200 functions as the producer for a service A, and the server 210 functions as the producer for a service B. Each of the servers 200, 210, and so on may execute multiple services. The server 200 and the server 210 are examples of the third information processing apparatus 30 according to the first embodiment.

The multiple servers functioning as the brokers include servers 300, 310, 400, and so on. Each of the servers functioning as the brokers mediates transfer of data collected by the server functioning as the producer to the server functioning as the consumer. The server functioning as the broker enqueues (temporarily holds) data collected by the server functioning as the producer in the main storage device, and, in response to a request, dequeues the data and provides the data to the server functioning as the consumer. For example, the server functioning as the broker functions as a data buffer.

For example, the server 300 functions as the broker for the service A, and the sever 310 functions as the broker for the service B. The server 400 may function as the broker for both the service A and the service B.

The server 400 is a computer in which the main storage device is expanded as compared with the servers 300 and 310. The server 400 is, for example, the computer in which the main storage device is expanded by including a DCPM as a part of the main storage device.

The server 400 will be referred to as a memory-expanded server, and the servers 300 and 310 will be referred to as normal servers in some cases. The servers 300 and 310 are examples of the first information processing apparatus 10 according to the first embodiment. The server 400 is an example of the second information processing apparatus 20 according to the first embodiment.

The multiple servers functioning as the consumers include servers 500, 510, and so on. Each of the servers functioning as the consumers acquires data held in the queue by the server functioning as the broker and executes processing depending on a service by using the data. In the information processing system 100, each of the servers 500, 510, and so on functions as the consumer for a certain service.

Hereinafter, a combination of servers that perform processing for a service (service A or service B) will be referred to as a service processing system (service A processing system or service B processing system).

The management apparatus 600 manages service processing systems for respective services to be provided by the information processing system 100. In relation to the occurrence of an event expected to involve an increase in the data volume when executed in a service, the management apparatus 600 monitors the data volume of the service processing system performing processing for the service. Based on the monitoring result, the management apparatus 600 performs processing of switching the server to be operated as the broker for the service (service processing system) in which the event is to be executed.

In the stream processing, data held in the main storage device of the broker increases if the speed of data storage into the broker (enqueue processing) exceeds the speed of data acquisition from the broker (dequeue processing). As a result, the capacity shortage may occur if only the main storage device of the broker is used and the data may not be held by using the main storage device alone.

In this case, data that is not storable in the main storage device is swapped out to the swap area of the auxiliary storage device. The access speed to the auxiliary storage device is significantly lower than that to the main storage device. For this reason, when data is stored in the auxiliary storage device, the access speed to the data decreases and acquisition of the data from the broker is delayed, so that a delay may occur in the stream processing (service).

For example, a conceivable solution to stop the enqueue processing from outpacing the dequeue processing is to ensure sufficient processing performance of the consumer.

However, there is a case where a sudden increase in the data volume occurs due to an event. For this reason, it is difficult to avoid the swapping-out of data to the swap area of the auxiliary storage device only by ensuring the processing performance of the consumer.

To address this, for a service involving a small data volume, the management apparatus 600 operates the normal server for the service as the broker.

Then, when the data volume of the service increases (in relation to the occurrence of an event), the management apparatus 600 performs processing of switching the server to be operated as the broker for the service from the normal server to the memory-expanded server. Before the switching, the management apparatus 600 may newly deploy a broker for the service to the memory-expanded server. As described above, when the data volume of a service increases, the management apparatus 600 allocates the main storage device having the large capacity to cope with a sudden increase in the data volume.

Thus, even when the data volume of the service increases, the management apparatus 600 enables the service to be provided without causing an extreme deterioration of service performance due to swapping-out, thereby improving the reliability of the service.

The memory-expanded server is not used for a service when the data volume of the service is small, and is operated as the broker when the data volume of the service increases. Thus, the memory-expanded server that copes with increases in data volumes may be shared by multiple services. Thus, the management apparatus 600 achieves cost saving because it is unnecessary to additionally prepare a memory-expanded server including a main storage device with a large capacity for each service in order to cope with an increase in the data volume.

When the data volume of a service increases, the management apparatus 600 switches the server to be operated as the broker for the service from the normal server to the memory-expanded server, and thus operates only the one server as the broker. As a result of this, the management apparatus 600 enables simple control of the enqueue processing by the producer and the dequeue processing by the consumer.

Figure 3:
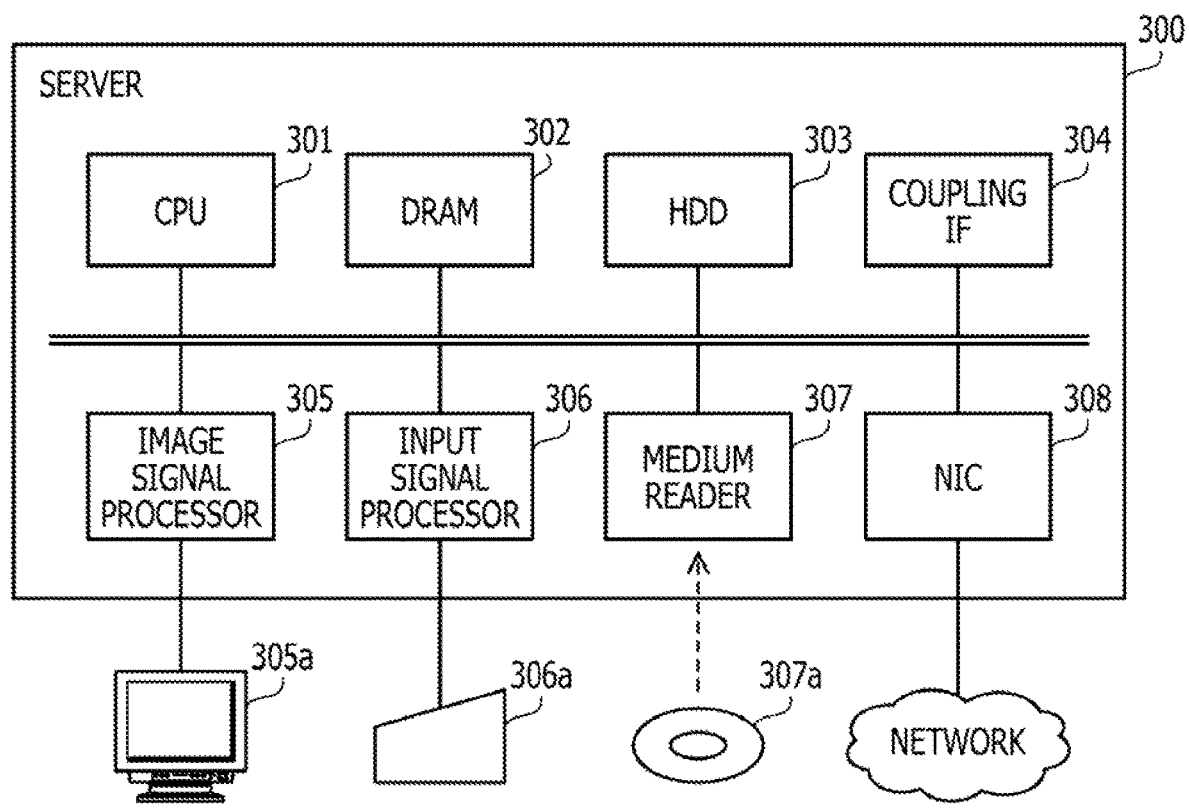
FIG. 3 illustrates an example of hardware of a normal server.

Next, hardware of the server 300 will be described. FIG. 3 illustrates an example of hardware of a normal server.

The server 300 includes a CPU 301, a DRAM 302, a HDD 303, a coupling interface (IF) 304, an image signal processor 305, an input signal processor 306, a medium reader 307, and an NIC 308. These hardware components are coupled to a bus of the server 300. The DRAM 302 is an example of the first memory 11 according to the first embodiment. The HDD 303 is an example of the second memory 12 according to the first embodiment.

The CPU 301 is a processor that executes instructions of a program. The CPU 301 loads at least part of the program and data stored in the HDD 303 into the DRAM 302, and executes the program. The CPU 301 may include multiple processor cores, and the server 300 may include multiple processors.

The DRAM 302 is a main storage device of the server 300. The main storage device may also be referred to as a main memory or the like. The DRAM 302 temporarily stores at least part of an operating system (OS) program and application programs to be executed by the CPU 301. The DRAM 302 stores various kinds of data to be used for processing by the CPU 301.

The HDD 303 is an auxiliary storage device of the server 300. The HDD 303 magnetically writes and reads data to and from a built-in magnetic disk. The HDD 303 stores the OS program, the application programs, and various kinds of data. The server 300 may include another type of auxiliary storage device such as a flash memory or an SSD, and may include multiple auxiliary storage devices.

The coupling IF 304 couples peripheral devices. The coupling IF 304 acquires data from various coupling devices coupled to the server 300 in accordance with instructions from the CPU 301.

The image signal processor 305 outputs images to a display 305a coupled to the server 300 in accordance with instructions from the CPU 301. As the display 305a, a cathode ray tube (CRT) display, a liquid crystal display, or the like may be used.

The input signal processor 306 acquires an input signal from an input device 306a coupled to the server 300, and outputs the input signal to the CPU 301. As the input device 306a, for example, a pointing device such as a mouse or a touch panel, a keyboard, or the like may be used.

The medium reader 307 is a device that reads programs and data recorded in a recording medium 307a. As the recording medium 307a, for example, a magnetic disk such as a flexible disk (FD) or an HDD, an optical disk such as a compact disc (CD) or a Digital Versatile Disc (DVD), or a magneto-optical disc (MO) may be used. As the recording medium 307a, for example, a nonvolatile semiconductor memory such as a flash memory card may also be used. For example, in accordance with instructions from the CPU 301, the medium reader 307 stores programs and data read from the recording medium 307a into the DRAM 302 or the HDD 303.

The NIC 308 performs communication with other devices via a network. The NIC 308 may be a wired communication interface or a wireless communication interface.

The server 300 may implement the processing functions of the second embodiment with the hardware configuration described above. Each of the servers 200, 210, 310, 500, and 510 and the management apparatus 600 may be implemented by using the same hardware as that of the server 300. Each of the first information processing apparatus 10, the third information processing apparatus 30, and the fourth information processing apparatus 40 described in the first embodiment may also be implemented by the same hardware as that of the server 300 illustrated in FIG. 3.

Figure 4:
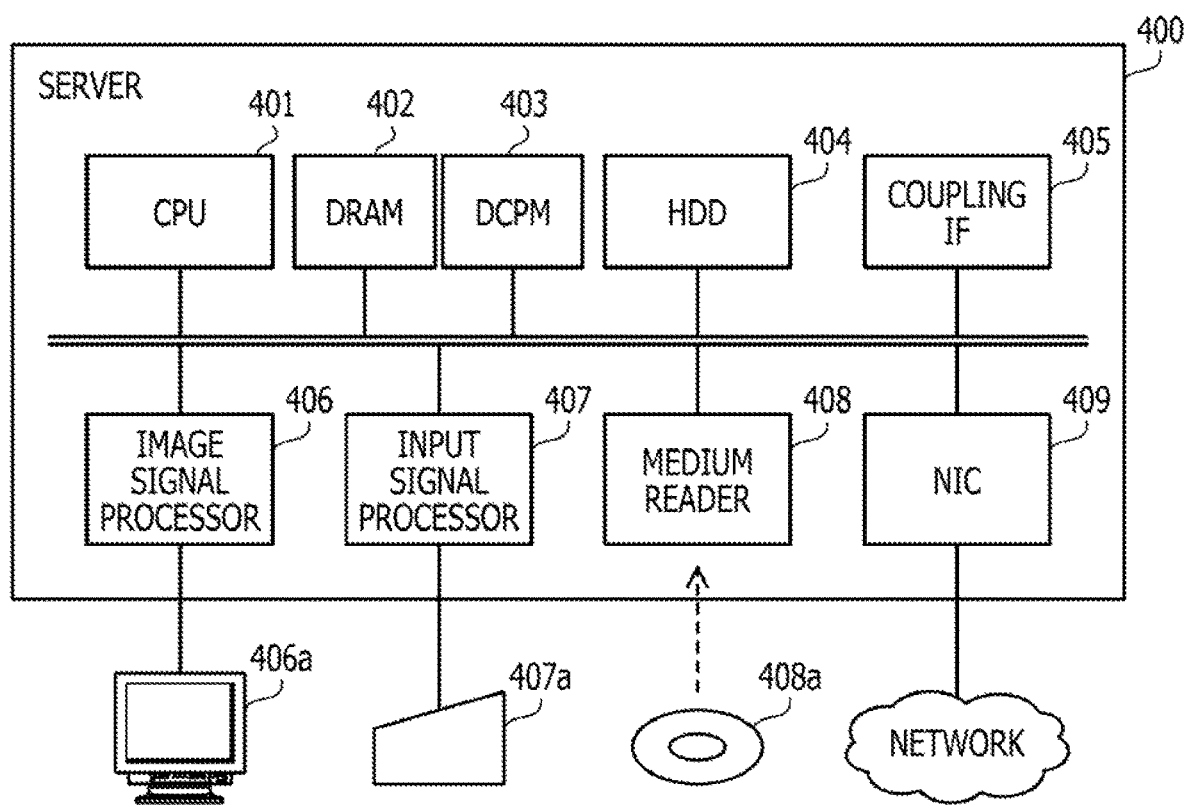
FIG. 4 illustrates an example of hardware of a memory-expanded server.

Next, hardware of the server 400 will be described. FIG. 4 illustrates an example of hardware of a memory-expanded server.

The server 400 includes a CPU 401, a DRAM 402, a DCPM 403, a HDD 404, a coupling IF 405, an image signal processor 406, an input signal processor 407, a medium reader 408, and an NIC 409. These hardware components are coupled to a bus of the server 400. The DRAM 402 is an example of the third memory 21 according to the first embodiment. The DCPM 403 is an example of the fourth memory 22 according to the first embodiment.

The CPU 401 is a processor that executes instructions of a program. The CPU 401 loads at least part of the program and data stored in the HDD 404 into the DRAM 402, and executes the program. The CPU 401 may include multiple processor cores, and the server 400 may include multiple processors.

The DRAM 402 is a main storage device of the server 400. The DRAM 402 temporarily stores at least part of an operating system (OS) program and application programs to be executed by the CPU 401. The DRAM 402 stores various kinds of data to be used for processing by the CPU 401.

The DCPM 403 is a main storage device of the server 400. The DCPM 403 stores various kinds of data to be used for processing by the CPU 401. The DCPM 403 is a memory having an access speed lower than that of the DRAM 402 but higher than that of the HDD 404 or the SSD. The DCPM 403 is coupled via the same slot as a slot for DRAM insertion (for example, a DIMM slot) on a main board of the server 400.

The DCPM 403 has a larger capacity than the DRAM 402 has. Therefore, use of the DCPM 403 enables allocation of a larger capacity than in a case where only the DRAM 402 is used, and accordingly achieves expansion of the memory. The DCPM 403 is superior to the DRAM 402 in terms of a cost/capacity ratio. Therefore, in the case where the DCPM 403 is allocated as the capacity of the main storage device, it is possible to allocate the capacity at a lower cost than in the case where the DRAM 403 is allocated as the capacity of the main storage device. However, the access speed of the DRAM 402 is higher than that of the DCPM 403.

The following description will be given on the assumption that each of the servers 300 and 310 uses, as the main storage device, the DRAM having a first capacity and does not use any DCPM, whereas the server 400 uses, as the main storage device, the DRAM having the first capacity and the DCPM having a second capacity larger than the first capacity.

For example, the total DRAM capacity of the server 400 is smaller than the total DRAM capacity of the servers 300 and 310, and the capacity of the main storage device of the server 400 is larger than the capacity of the main storage devices of the servers 300 and 310. The capacity of the DRAMs 302 of the servers 300 and 310 (the capacity of the main storage device) is a capacity requested for normal operations, which is, for example, a capacity fulfilling a capacity requested to process the data volume for services in the normal operations.

The HDD 404 is an auxiliary storage device of the server 400. The HDD 404 magnetically writes and reads data to and from a built-in magnetic disk. The HDD 404 stores an OS program, an application program, and various kinds of data. The server 400 may include another type of auxiliary storage device such as a flash memory or an SSD, and may include multiple auxiliary storage devices.

The coupling IF 405 couples peripheral devices. The coupling IF 405 acquires data from various coupling devices coupled to the server 400 in accordance with instructions from the CPU 401.

The image signal processor 406 outputs images to a display 406a coupled to the server 400 in accordance with instructions from the CPU 401. As the display 406a, a CRT display, a liquid crystal display, or the like may be used.

The input signal processor 407 acquires an input signal from an input device 407a coupled to the server 400, and outputs the input signal to the CPU 401. As the input device 407a, for example, a pointing device such as a mouse or a touch panel, a keyboard, or the like may be used.

The medium reader 408 is a device that reads programs and data recorded in a recording medium 408a. As the recording medium 408a, for example, a magnetic disk such as a flexible disk or an HDD, an optical disk such as a CD or a DVD, or a magneto-optical disc may be used. As the recording medium 408a, for example, a nonvolatile semiconductor memory such as a flash memory card may also be used. For example, in accordance with instructions from the CPU 401, the medium reader 408 stores programs and data read from the recording medium 408a into the DRAM 402, the DCPM 403, or the HDD 404.

The NIC 409 performs communication with other devices via a network. The NIC 409 may be a wired communication interface or a wireless communication interface.

The server 400 may implement the processing functions of the second embodiment with the hardware configuration described above. The second information processing apparatus 20 described in the first embodiment may also be implemented by the same hardware as that of the server 400 illustrated in FIG. 4.

Figure 5:
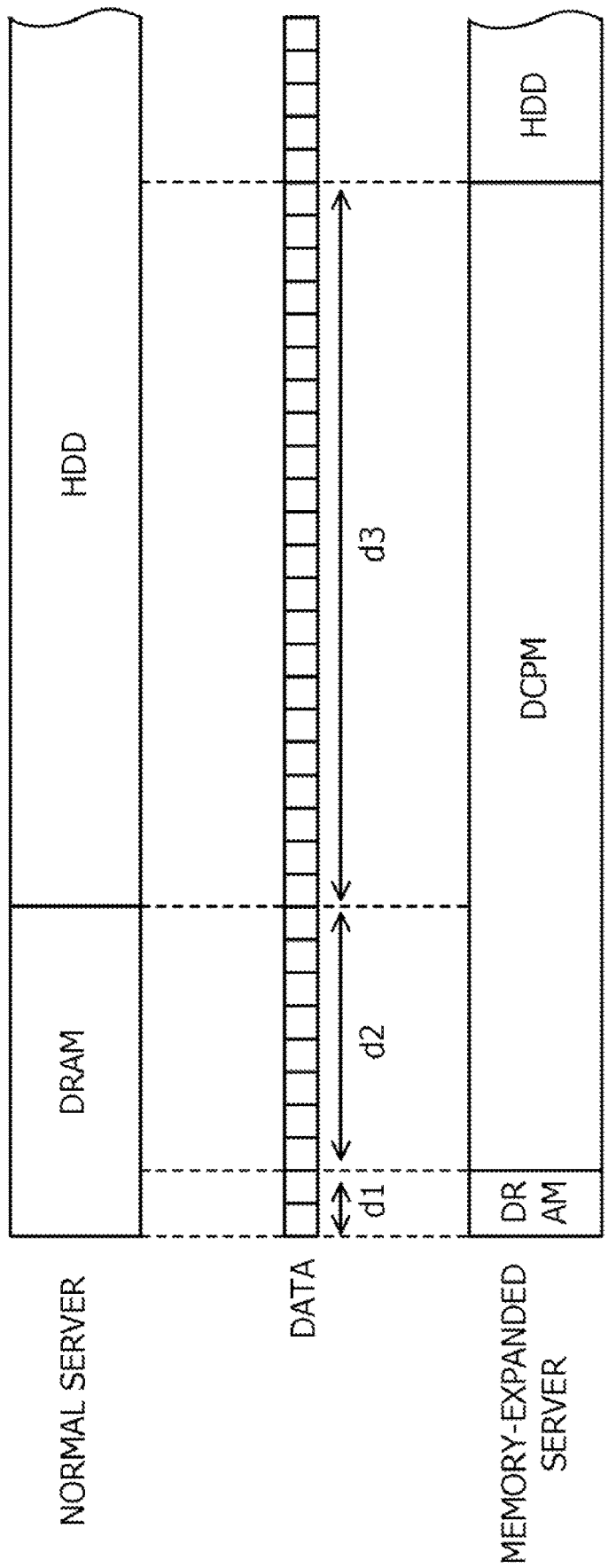
FIG. 5 is a diagram for explaining data access speeds of the normal server and the memory-expanded server.

Next, an overview of data processing speeds of the normal server and the memory-expanded server will be described. FIG. 5 is a diagram for explaining data access speeds of the normal server and the memory-expanded server.

In the normal server, when a data volume is d1+d2 or smaller, the data is storable in the capacity of the DRAM, and therefore the access speed to data of d+d2 or smaller is high.

On the other hand, when a data volume exceeds d+d2, the normal server is unable to store the data in the exceeding range by using the capacity of the DRAM alone, and therefore swaps out the data to a part of the HDD. Therefore, in the normal server, the access speed to the data exceeding d1+d2 is low.

In the memory-expanded server, when a data volume is d1 or smaller, the data is storable in the capacity of the DRAM, and therefore the access speed to data of d1 or smaller is high.

On the other hand, when a data volume exceeds d1 and is equal to or smaller than d1+d2+d3, the memory-expanded server is unable to store the data in the range exceeding d1 by using the capacity of the DRAM alone, and therefore stores the data into the capacity of the DCPM.

Therefore, in the memory-expanded server, the access speed to data in a data volume within the range from d1 to d1+d2+d3 is higher than that of the HDD or the SSD, although not as high as that of the DRAM.

For example, in the memory-expanded server, the access speed to data in a data volume within the range from d1 to d1+d2 is slightly lower than that of the normal server. On the other hand, in the memory-expanded server, the access speed to data in a data volume within the range from d1+d2 to d1+d2+d3 is higher than that of the normal server.

When a data volume exceeds d1+d2+d3, the memory-expanded server is unable to store the data in the exceeding range by using only the capacity of the main storage device (the DRAM and the DCPM), and therefore swaps out the data to a part of the HDD. Therefore, in the memory-expanded server, the access speed to data exceeding d1+d2+d3 is low.

As described above, the memory-expanded server does not perform swapping-out to the auxiliary storage device for a wider range of data volume than that of the normal server, and therefore guarantees the access speed even when the data volume significantly increases.

For example, even when the data volume significantly increases due to an event, the memory-expanded server enables the service to be provided without causing an extreme deterioration in processing performance in the service, thereby improving the reliability of the service.

Since the memory-expanded server is equipped with the DCPM instead of the DRAM to expand the main storage device, and accordingly is equipped with only a small capacity of the DRAM. For this reason, in a range of a small data volume, the memory-expanded server has a data access speed equal or inferior to a data access speed of the normal server. Therefore, the information processing system 100 operates the normal server as the broker in normal operations and enables the memory-expanded server to operate as the broker in relation to the occurrence of an event, thereby suppressing a decrease in the access speed (deterioration in processing speed) in the normal operations.

Figure 6:
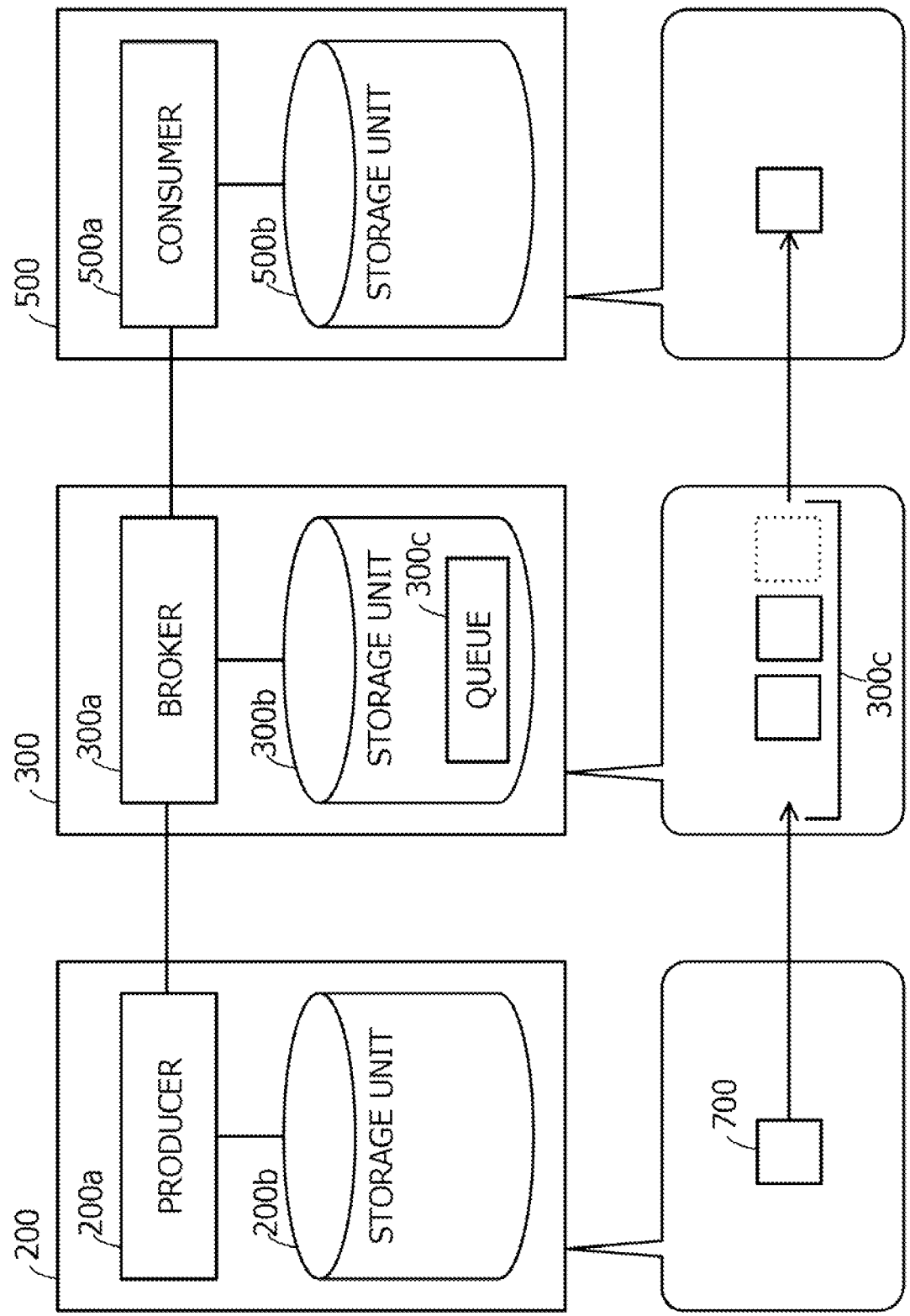
FIG. 6 is a block diagram illustrating functions of the information processing system.

Next, description will be given of functions of the server functioning as the producer, the server functioning as the broker, and the server functioning as the consumer. FIG. 6 is a block diagram illustrating functions of the information processing system.

The server 200, the server 300, and the server 500 will be described below as representative examples of the server functioning as the producer, the server functioning as the broker, and the server functioning as the consumer, respectively.

The server 200 includes a producer 200a and a storage unit 200b. The producer 200a is implemented by the CPU executing a program stored in the main storage device. A storage area of the main storage device or the auxiliary storage device is used for the storage unit 200b.

The producer 200a collects data 700 of an assigned service (for example, the service A) and transmits the collected data 700 to the server operating as the broker for the service A. The storage unit 200b stores various kinds of information to be used in processing executed by the producer (for implementing the producer functions).

The server 300 includes a broker 300a and a storage unit 300b. The broker 300a is implemented by the CPU 301 executing a program stored in the main storage device. A storage area of the main storage device or the auxiliary storage device is used for the storage unit 300b.

The broker 300a acquires the data 700 of the assigned service from the server operating as the producer for the service A. The broker 300a enqueues (stores) the acquired data 700 in a queue 300c of the storage unit 300b. In response to a request from the server operating as the consumer for the service A, the broker 300a dequeues the data 700 from the queue 300c and transmits the dequeued data 700 to the server operating as the consumer for the service A.

The storage unit 300b stores various kinds of information to be used in processing executed by the broker. The storage unit 300b includes the queue 300c in which the data 700 is stored.

The server 500 includes a consumer 500a and a storage unit 500b. The consumer 500a is implemented by the CPU executing a program stored in the main storage device. A storage area of the main storage device or the auxiliary storage device is used for the storage unit 500b.

The consumer 500a acquires the data 700 of the assigned service (for example, the service A) from the server operating as the broker for the service A. The consumer 500a executes processing depending on the service A by using the acquired data 700. The storage unit 500b stores various kinds of information to be used in the processing executed by the consumer.

Figure 7:
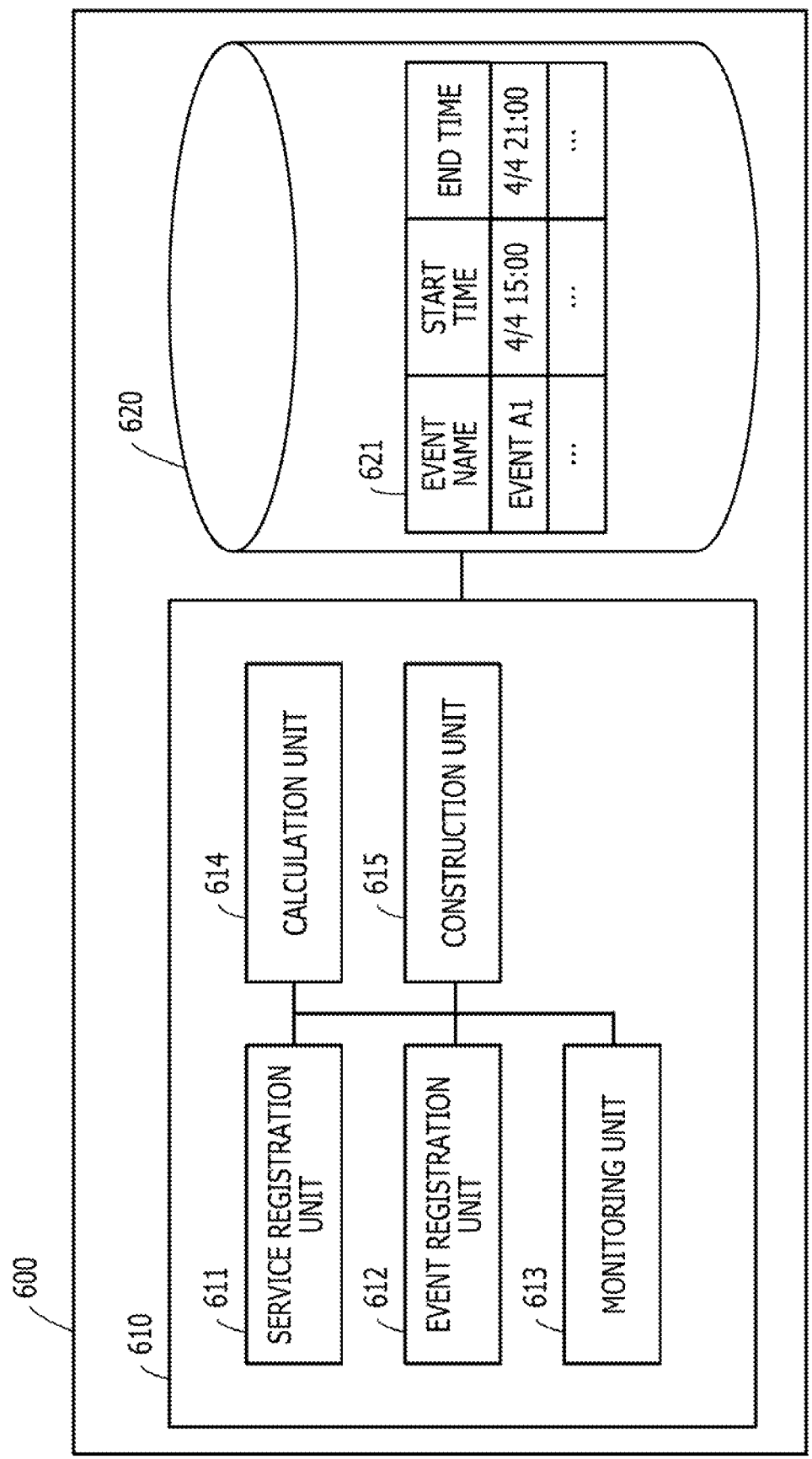
FIG. 7 is a block diagram illustrating functions of a management apparatus.

Next, functions of the management apparatus 600 will be described. FIG. 7 is a block diagram illustrating functions of the management apparatus.

The management apparatus 600 includes a construction manager 610 and a storage unit 620. The construction manager 610 is implemented by the CPU executing a program stored in the main storage device. A storage area of the main storage device or the auxiliary storage device is used for the storage unit 620.

The construction manager 610 manages a service processing system for each service to be provided by the information processing system 100. The construction manager 610 includes a service registration unit 611, an event registration unit 612, a monitoring unit 613, a calculation unit 614, and a construction unit 615.

The service registration unit 611 determines servers in charge of a service newly registered as a service to be provided by the information processing system 100, and stores the determination result into the storage unit 620. For example, when a service is registered, the service registration unit 611 determines a server to function as the producer for the service, servers to function as brokers (for example, a normal server and a memory-expanded server), and a server to function as the consumer.

The event registration unit 612 obtains input of event information (for example, an event name and date and time of occurrence of the event (a start time and an end time)) from which the date and time of the occurrence of an event expected to involve an increase in the data volume when executed in the service are recognizable. The event registration unit 612 registers the obtained event information into an event table 621 managed by the storage unit 620.

Based on the event information, the monitoring unit 613 performs monitoring processing of monitoring an operation condition of the service processing system that performs processing for the service in which the event is executed (for example, the operation condition is a volume of data received by the server operating as the broker). The monitoring unit 613 starts performing the monitoring processing a predetermined time before the start time of the event. The volume of data received is the size of data received per unit time and is expressed in the unit of kilobytes/second, for example.

In addition to the volume of data received by the above server, the monitoring unit 613 may monitor the volume of data transmitted, the memory usage, the volume of data written to the HDD, and so on in each server.

The calculation unit 614 calculates and sets a first trigger and a second trigger. The first trigger is a condition to be used when the server to be operated as the broker for the service is switched from the normal server to the memory-expanded server. The second trigger is a condition to be used when the server to be operated as the broker is switched from the memory-expanded server to the normal server. For example, the calculation unit 614 sets the first trigger and the second trigger to be used to switch the server to be operated as the broker for the service based on the amount of memory and a maximum data receivable volume of the normal server. The maximum data receivable volume is the maximum value of the data volume receivable per unit time. The maximum data receivable volume is measured in advance for the server. The first trigger is used to detect an increase in memory usage of the server due to an increase in the number of requests for the service. The second trigger is used to detect a decrease in the memory usage of the server due to a decrease in the number of requests for the service.

Based on the monitoring result, the first trigger, and the second trigger, the construction unit 615 performs the processing of switching the server to be operated as the broker for the service in which the event is executed, and reconstructs the device configuration in operation into a new device configuration.

The data volume gradually increases from a predetermined time before the event toward the start of the event, and decreases after the end of the event. Thus, for example, when the first trigger is satisfied in a period from a predetermined time before the start time of the event to the end time of the event, the construction unit 615 switches the server to be operated as the broker for the service in which the event is executed from the normal server to the memory-expanded server. This is because the satisfaction of the first trigger indicates an increasing tendency of the volume of data received and it is expected that the possibility of occurrence of swapping-out will become high from now on.

When the second trigger is satisfied after the end time of the event, the construction unit 615 switches the server to be operated as the broker for the service in which the event was executed from the memory-expanded server to the normal server. This is because the satisfaction of the second trigger indicates a decreasing tendency of the volume of data received and it is expected that the possibility of occurrence of swapping-out will become low from now on.

The storage unit 620 stores information to be used for various kinds of processing executed by the management apparatus 600. For example, the storage unit 620 stores an event table 621. The event table 621 is provided for each service, for example. The event table 621 is a table that registers event information from which the date and time of an event in the service are recognizable (an event name, a start time, and an end time).

The storage unit 620 stores a table in which services assigned to each server are set, a device configuration of the service processing system for each service, and the first trigger and the second trigger for each service.

Figure 8:
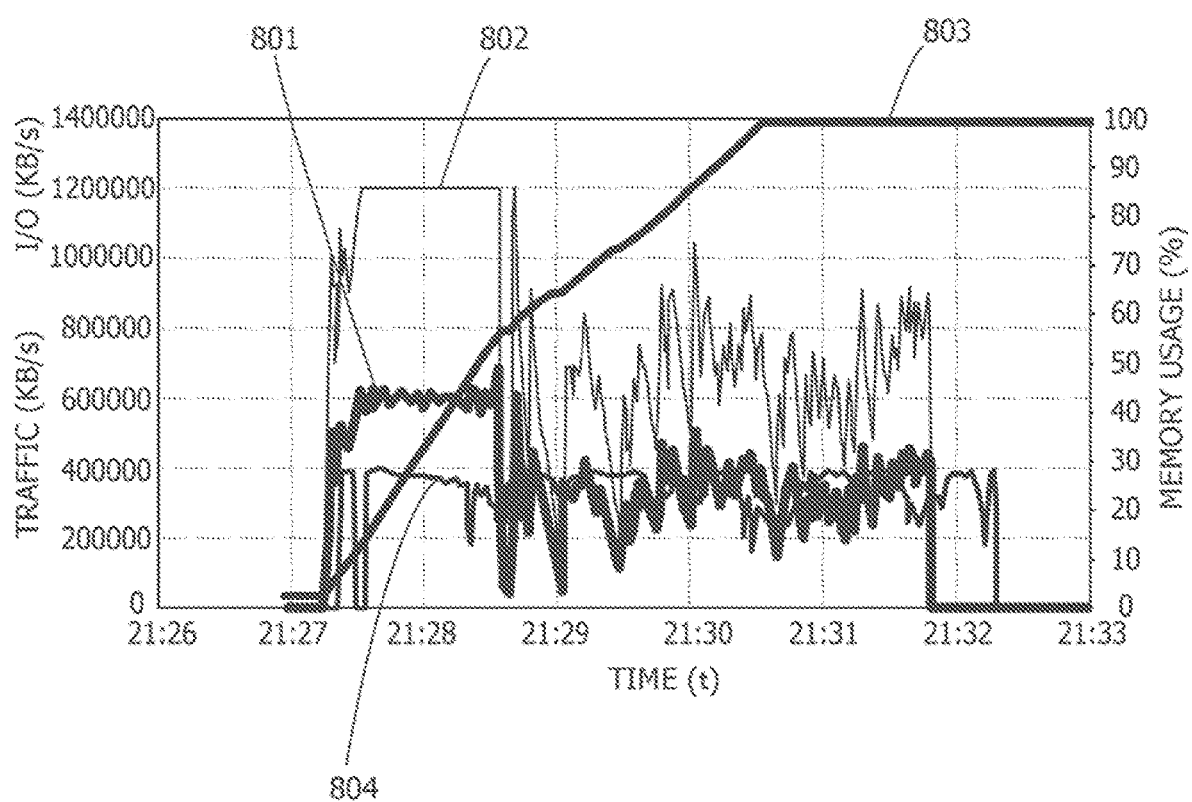
FIG. 8 is a graph illustrating a result of an experiment in which a data volume transmitted from a producer to a broker was increased.

Next, an example of the first trigger and the second trigger to be used to switch the server to be operated as the broker for the service will be described. The first trigger and the second trigger are respectively equivalent to an attachment condition and a detachment condition of the memory-expanded server. FIG. 8 is a graph illustrating a result of an experiment in which the data volume transmitted from the producer to the broker was increased.

The experiment was performed under the conditions that the CPU of the server to be operated as a producer was a 16-core CPU of Xeon (registered trademark) and the volume of data transmitted was 256 GB. In addition, two servers were prepared as servers to be operated as brokers, and the producer was set to distribute and transmit the data to the two servers. The experiment was performed under the conditions that the two servers functioning as the brokers used main storage devices (DRAMs) of 80 GB and auxiliary storage devices (SSDs) of 400 GB. The experiment was performed under the condition that the network was 10 Gbps Ethernet (registered trademark).

An experiment result 800 indicates the volume of data transmitted by the server operating as the producer, and the volume of data received, the memory usage, and the volume of I/O write by the servers operating as the brokers in a case where the server operating as the producer continuously transmitted the data at the transmission limit value.

A line plot 801 indicates changes in the volume of data received by the servers operating as the brokers. A line plot 802 indicates changes in the volume of data transmitted by the server operating as the producer. A line plot 803 indicates changes in the memory usage of the servers operating as the brokers. A line plot 804 indicates changes in the volume of I/O write to the swap area in the servers operating as the brokers.

As indicated by the experiment result 800, when the server operating as the producer transmitted the data at the transmission limit to the servers operating as the brokers, the memory usage increased because the data was written to the main storage devices. In the experimental result 800, when the memory usage reaches about 55%, the rate of increase in the memory usage slows down (the slope of the increase changes), and accordingly, the volume of data received by the servers operating as the brokers decreases. This indicates that an increase in the memory usage (a shortage of the capacity of the main storage devices) disables data from being processed, and the transmission side is requested to wait so as to decrease the volume of data transmitted, so that the volume of data transmitted decreases and consequently the volume of data received decreases. For example, this state indicates a state in which a capacity shortage of the main storage devices may cause swapping-out, and indicates a state in which the data access speed may decrease.

To address this, in the information processing system 100, the management apparatus 600 performs control to switch to the memory-expanded server before the memory usage in the main storage device of the normal server reaches, for example, about 55% (the state where swapping-out may occur due to a capacity shortage of the main storage device of the normal server).

In order to switch to the memory-expanded server before the memory usage reaches about 55%, the first trigger is set, for example, such that the volume of data received stays at an approximate value of the maximum data receivable volume continuously for a time period during which continuous reception of the maximum data receivable volume consumes 33% of the memory. The second trigger is set such that the volume of data received falls and stays below the approximate value of the maximum data receivable volume continuously for a predetermined time.

Here, Rx denotes the volume of data received per unit time by the server operating as the broker, RxMax denotes the maximum data receivable volume per unit time of the server operating as the broker, and M denotes the capacity of the main storage device of the normal server (the unit is, for example, gigabytes). In addition, 0.95 RxMax is set as a threshold for an approximate value of the maximum data receivable volume.

In this case, for example, the calculation unit 614 sets the first trigger such that the state of 0.95 RxMax 5 Rx continues for M/3×RxMax seconds. The calculation unit 614 sets the second trigger such that the state of Rx<0.95 RxMax continues for M/3 RxMax seconds.

Figure 9:
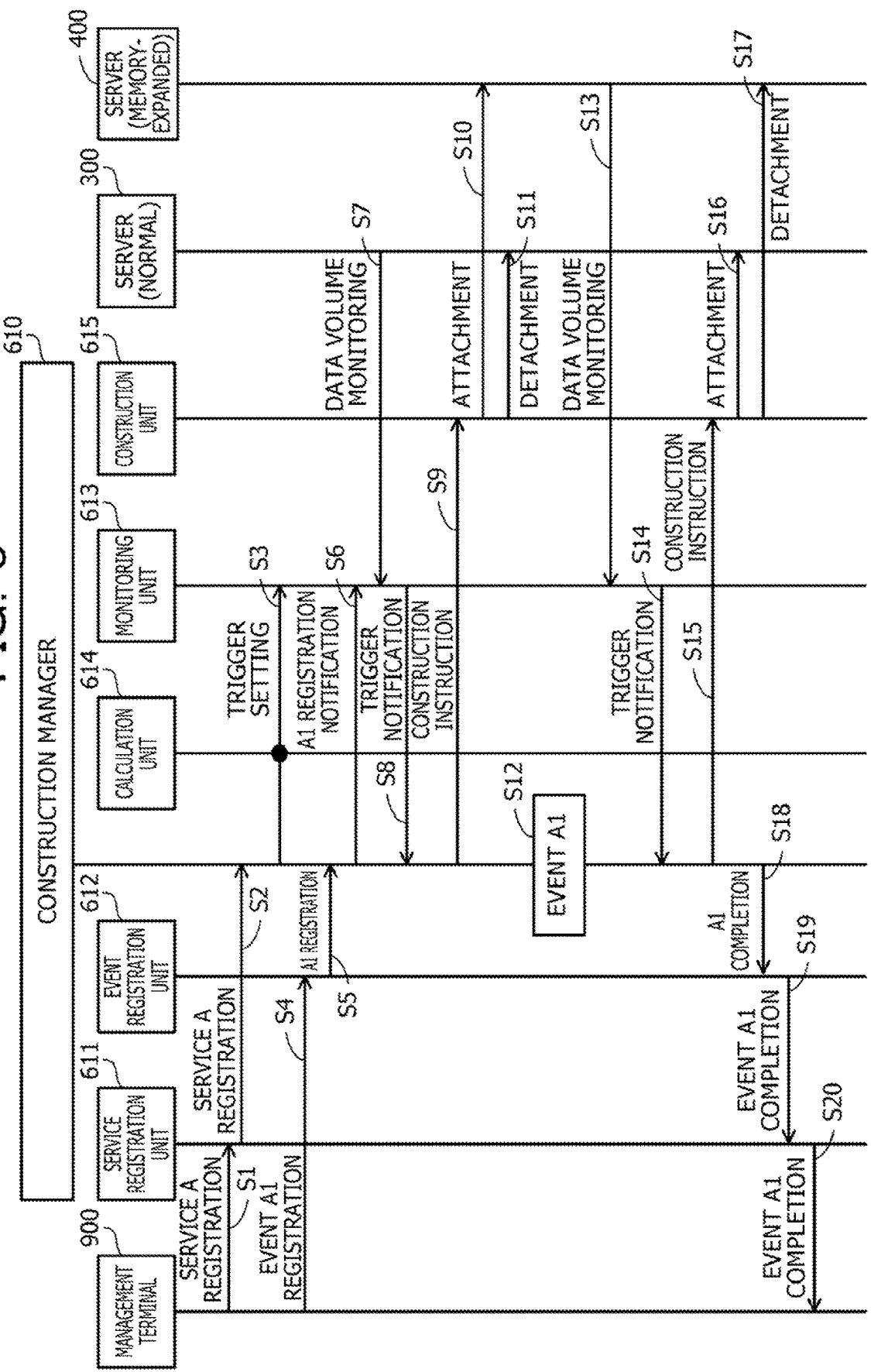
FIG. 9 is a sequence diagram illustrating an example of a sequence of processing by the management apparatus.

Next, management of the service processing system for each service by the management apparatus 600 will be described. FIG. 9 is a sequence diagram illustrating an example of a processing sequence of the management apparatus. Management of the service A processing system that performs processing for the service A is described herein as a representative, but the same procedure is applied to the service B. For example, the following processing may be executed for both the services A and B in the same time slot.

[S1] The service registration unit 611 receives registration of the service A from a system administrator for the service A. For example, the system administrator may operate a management terminal 900 coupled to the network to input the registration of the service A to the management apparatus 600. Upon receiving the registration of the service A, the service registration unit 611 determines servers in charge of the service A (a server to function as a producer, servers to function as brokers (a normal server and a memory-expanded server), and a server to function as a consumer).

For example, the service registration unit 611 determines the server 200 as the server to function as the producer for the service A. The service registration unit 611 determines the server 300 as the normal server to function as the broker for the service A and determines the server 400 as the memory-expanded server to function as the broker for the service A. The service registration unit 611 determines the server 500 as the server to function as the consumer for the service A. The service registration unit 611 may newly deploy the producer, the brokers, and the consumer to the relevant servers for the service A.

[S2] The service registration unit 611 notifies the construction manager 610 that the service A is registered.

[S3] The construction manager 610 requests the calculation unit 614 to set the triggers (the first trigger and the second trigger) for the service A. The calculation unit 614 makes calculation to obtain the first trigger to be used to switch the broker for the service A from the normal server to the memory-expanded server and the second trigger to be used to switch the broker for the service A from the memory-expanded server to the normal server, and sets the first trigger and the second trigger in the monitoring unit 613.

[S4] The event registration unit 612 receives event information on an event A1 for the service A from the management terminal 900. Upon receiving the event information on the event A1 for the service A from the system administrator, the event registration unit 612 registers the event information on the event A1 in the event table 621.

[S5] The event registration unit 612 notifies the construction manager 610 that the event information on the event A1 is registered.

[S6] The construction manager 610 notifies the monitoring unit 613 that the event A1 for the service A is registered.

[S7] The monitoring unit 613 detects that the monitoring start timing of the monitoring processing associated with the occurrence of the event A1 arrives. For example, the monitoring unit 613 detects that the monitoring start timing arrives when the current time reaches a predetermined time before the start time of the event A1. Upon detecting that the monitoring start timing arrives, the monitoring unit 613 starts monitoring the data traffic of the server 300 functioning as the broker for the service A.

[S8] The monitoring unit 613 notifies the construction manager 610 of a trigger notification indicating that the condition of the first trigger for server switching is satisfied.

[S9] Upon receiving the trigger notification, the construction manager 610 notifies the construction unit 615 of a construction instruction to instruct server switching for the service A.

[S10] The construction unit 615 attaches the server 400, which is, for example, the memory-expanded server to the service A. For example, the construction unit 615 may newly deploy the broker for the service A in the server 400. The construction unit 615 may instruct the producer for the server 200 to change the destination of data transmission to the server 400. It is also conceivable that the construction unit 615 transmits an instruction to add the server 400 as a destination of data forwarding to a communication device such as a load distribution device that receives data from the producer and forwards the data to the server 300.

[S11] The construction unit 615 detaches the server 300, which is, for example, the normal server, from the service A. For example, the construction unit 615 may stop the broker for the service A in the server 300. It is also conceivable that the construction unit 615 transmits an instruction to delete the server 300 as the destination of data forwarding from the communication device that receives data from the producer in the server 200 and forwards the data to the servers 300 and 400.

[S12] The construction manager 610 detects that the start time of the event A1 arrives.

[S13] Upon detecting that the completion time of the event A1 arrives, the monitoring unit 613 starts monitoring the data traffic of the server 400 functioning as the broker for the service A.

[S14] The monitoring unit 613 notifies the construction manager 610 of a trigger notification indicating that the condition of the second trigger for server switching is satisfied.

[S15] Upon receiving the trigger notification, the construction manager 610 notifies the construction unit 615 of a construction instruction to instruct server switching for the service A.

[S16] The construction unit 615 attaches the server 300, which is, for example, the normal server, to the service A. For example, the construction unit 615 may newly deploy the broker for the service A in the server 300. The construction unit 615 may instruct the producer in the server 200 to change the destination of data transmission to the server 300. Alternatively, it is also conceivable that the construction unit 615 transmits an instruction to add the server 300 as the destination of data forwarding to the communication device that receives data from the producer and forwards the data to the server 400.

[S17] The construction unit 615 detaches the server 400, which is, for example, the memory-expanded server, from the service A. For example, the construction unit 615 may stop the broker for the service A in the server 400. It is also conceivable that the construction unit 615 transmits an instruction to delete the server 400 as the destination of data forwarding from the communication device that receives data from the producer in the server 200 and forwards the data to the servers 300 and 400.

[S18] The construction manager 610 notifies the event registration unit 612 that the event A1 is completed.

[S19] Upon receiving the notification that the event A1 is completed from the construction manager 610, the event registration unit 612 notifies the service registration unit 611 that the event A1 Is completed.

[S20] Upon receiving the notification that the event A1 is completed from the event registration unit 612, the service registration unit 611 notifies the management terminal 900 that the event A1 is completed.

Figure 10:
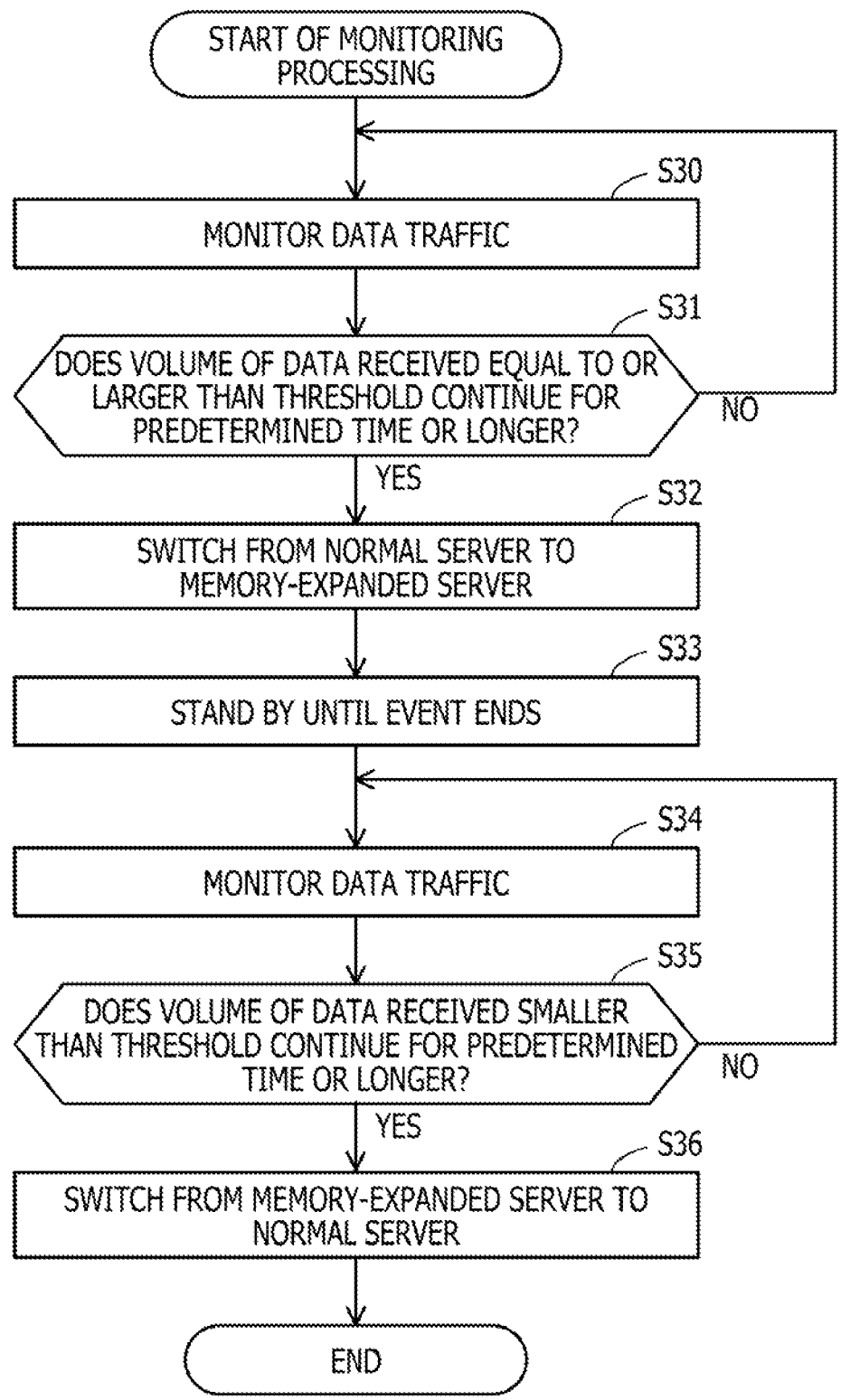
FIG. 10 is a flowchart illustrating an example of monitoring processing.

Next, a procedure of monitoring processing executed by the monitoring unit 613 and the construction unit 615 will be described. FIG. 10 is a flowchart illustrating an example of monitoring processing. The monitoring processing is executed when an event expected to involve an increase in the data volume occurs in a service. The monitoring processing is processing of monitoring a service processing system that executes processing for a service in which an event occurs and switching a server operating as a broker for the service to a normal server or a memory-expanded server. The following will describe an example of the monitoring processing executed when an event A1 of a service A occurs. For example, the following procedure corresponds to steps S7 to S11 and steps S13 to S17.

[S30] The monitoring unit 613 monitors the data traffic of the server operating as the broker for the service A (service A processing system), which is, for example, the normal server.

[S31] The monitoring unit 613 determines whether or not a volume of data received equal to or larger than a threshold continues for a predetermined time or longer in the server. For example, the monitoring unit 613 determines whether or not the first trigger set by the calculation unit 614 is satisfied.

The monitoring unit 613 proceeds to step S32 when it determines that the volume of data received equal to or larger than the threshold continues for the predetermined time or longer or proceeds to step S30 when it determines that the volume of data received equal to or larger than the threshold does not continue for the predetermined time or longer.

[S32] The construction unit 615 performs the processing of switching the server operating as the broker for the service A from the normal server to the memory-expanded server. For example, the construction unit 615 executes processing of re-constructing the device configuration of the service A processing system.

[S33] The monitoring unit 613 stands by until the event ends (the end time of the event A1 arrives).

[S34] The monitoring unit 613 monitors the data traffic of the server operating as the broker for the service A, which is, for example, the memory-expanded server.

[S35] The monitoring unit 613 determines whether or not a volume of data received smaller than the threshold continues for a predetermined time or longer in the server. For example, the monitoring unit 613 determines whether or not the second trigger set by the calculation unit 614 is satisfied.

The monitoring unit 613 proceeds to step S36 when it determines that the volume of data received smaller than the threshold continues for the predetermined time or longer or proceeds to step S34 when it determines that the volume of data received smaller than the threshold does not continue for the predetermined time or longer.

[S36] The construction unit 615 performs the processing of switching the server to be operated as the broker for the service A from the memory-expanded server to the normal server. The monitoring unit 613 and the construction unit 615 end the monitoring processing.

In the case where the end time of the event arrives without executing step S32 while steps S30 and S31 are iterated, the monitoring unit 613 may end the monitoring processing.

The server 400 may function as a broker for the service B. For example, while the server 400 is functioning as a broker for the service A, the management apparatus 600 may attach the server 400 to the service B and cause the server 400 to function as the broker for both the services A and B. Alternatively, the management apparatus 600 may attach the server 400 to the service B after detaching the server 400 from the service A. In this way, it is possible to perform a flexible operation in which the memory-expanded server is shared by services depending on the loads for the services.

In the information processing system 100 according to the second embodiment, a memory-expanded server is attached in response to an increase in the load for a service. Thus, data swapping-out from a normal server may be avoided, and a decrease in the access speed to the data may be suppressed.

In addition, it is possible to provide a service without causing an extreme deterioration in service performance when the service encounters a sudden increase in the load that may be expected in advance. Furthermore, the memory-expanded server may be shared by multiple services and events, and a decrease in the operation rate of each server may be suppressed. This may improve the reliability of the services provided to the user.

The information processing according to the first embodiment may be implemented by causing the processing unit 42 to execute the program. The information processing according to the second embodiment may be implemented by causing a CPU of each server including the management apparatus 600 to execute the program.

The program may be recorded in a computer-readable recording medium. For example, the program may be circulated by distributing recording media in which the program is recorded. The program may be stored in another computer and distributed through a network. For example, a computer may store (install), in a storage device such as a RAM, the program recorded in a recording medium or the program received from another computer, and read the program from the storage device to execute the program.

Regarding embodiments including the first and second embodiments described above, the following claims are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising:
a communication circuit configured to communicate with a first information processing apparatus and a second information processing apparatus, the first information processing apparatus including a first memory and a second memory, the first memory being a memory to be used as a main storage device of the first information processing apparatus, the second memory being a memory having a swap area for the first memory and having an access speed lower than an access speed of the first memory, the second information processing apparatus including a third memory and a fourth memory, the third memory being a memory to be used as a main storage device of the second information processing apparatus, the fourth memory being a memory to be used as a main storage device and having an access speed lower than an access speed of the third memory and higher than the access speed of the second memory, a total capacity of the third memory and the fourth memory being larger than a capacity of the first memory; and
a processing circuit configured to
obtain, via the communication circuit, a data volume received by the first information processing apparatus from a third information processing apparatus,
detect an increase in usage of the first memory based on the data volume, and
perform control to switch, in response to the increase in the usage of the first memory, a destination of data transmission by the third information processing apparatus from the first information processing apparatus to the second information processing apparatus.

2. The management apparatus according to claim 1, wherein the processing circuit performs the control to switch the destination of data transmission by the third information processing apparatus from the first information processing apparatus to the second information processing apparatus when a time period during which the data volume stays equal to or larger than a first threshold reaches a second threshold.

3. The management apparatus according to claim 2, wherein the processing circuit calculates the second threshold based on the capacity of the first memory and a maximum value of a data volume receivable per unit time by the first information processing apparatus.

4. The management apparatus according to claim 1, the management apparatus further comprising a storage device configured to store information indicating a start time of an event for which the data volume is to be monitored, wherein the processing circuit starts obtaining the data volume before the start time based on the information stored in the storage device.

5. The management apparatus according to claim 1, wherein the processing circuit obtains the data volume received by the first information processing apparatus from a first service among a plurality of services executed by the third information processing apparatus, and performs control to switch a destination of data transmission by the first service from the first information processing apparatus to the second information processing apparatus in response to the increase in the usage of the first memory based on the data volume.

6. The management apparatus according to claim 1, wherein after performing the control to switch the destination of data transmission by the third information processing apparatus from the first information processing apparatus to the second information processing apparatus, the processing circuit obtains a first data volume received by the second information processing apparatus from the third information processing apparatus, detects a decrease in usage of the third memory and the fourth memory based on the first data volume, and performs control to switch the destination of data transmission by the third information processing apparatus from the second information processing apparatus to the first information processing apparatus in response to the decrease in the usage of the third memory and the fourth memory.

7. A non-transitory computer-readable storage medium for storing a program which cause a computer to execute a processing, the processing comprising:
obtaining first information by using a communication circuit, the communication circuit being configured to communicate with a first information processing apparatus and a second information processing apparatus, the first information processing apparatus including a first memory and a second memory, the first memory being a memory to be used as a main storage device of the first information processing apparatus, the second memory being a memory having a swap area for the first memory and having an access speed lower than an access speed of the first memory, the second information processing apparatus including a third memory and a fourth memory, the third memory being a memory to be used as a main storage device of the second information processing apparatus, the fourth memory being a memory to be used as a main storage device and having an access speed lower than an access speed of the third memory and higher than the access speed of the second memory, a total capacity of the third memory and the fourth memory being larger than a capacity of the first memory, the first information indicating a data volume received by the first information processing apparatus from a third information processing apparatus;
detecting an increase in usage of the first memory based on the data volume; and
performing control to switch, in response to the increase in the usage of the first memory, a destination of data transmission by the third information processing apparatus from the first information processing apparatus to the second information processing apparatus.

8. The non-transitory computer-readable storage medium according to claim 7, wherein the control includes performing control to switch the destination of data transmission by the third information processing apparatus from the first information processing apparatus to the second information processing apparatus when a time period during which the data volume stays equal to or larger than a first threshold reaches a second threshold.

9. The non-transitory computer-readable storage medium according to claim 8, the processing further comprising: calculating the second threshold based on the capacity of the first memory and a maximum value of the data volume receivable per unit time by the first information processing apparatus.

10. The non-transitory computer-readable storage medium according to claim 7, the processing further comprising: starting obtaining the data volume before a start time of an event for which the data volume is to be monitored, based on information stored in a storage unit that stores the information indicating the start time.

11. The non-transitory computer-readable storage medium according to claim 7, wherein
the obtaining includes obtaining the data volume received by the first information processing apparatus from a first service among a plurality of services executed by the third information processing apparatus, and
the control includes performing control to switch a destination of data transmission by the first service from the first information processing apparatus to the second information processing apparatus in response to the increase in the usage of the first memory based on the data volume.

12. The non-transitory computer-readable storage medium according to claim 7, the processing further comprising: after performing the control to switch the destination of data transmission by the third information processing apparatus from the first information processing apparatus to the second information processing apparatus, obtaining a first data volume received by the second information processing apparatus from the third information processing apparatus; detecting a decrease in usage of the third memory and the fourth memory based on the first data volume; and performing control to switch the destination of data transmission by the third information processing apparatus from the second information processing apparatus to the first information processing apparatus in response to the decrease in the usage of the third memory and the fourth memory.

* * * * *